US011233847B1

(12) United States Patent
Viccari et al.

(10) Patent No.: US 11,233,847 B1
(45) Date of Patent: *Jan. 25, 2022

(54) MANAGEMENT OF ALLOCATED COMPUTING RESOURCES IN NETWORKED ENVIRONMENT

(71) Applicant: Amazon Technologies, Inc., Seattle, WA (US)

(72) Inventors: Leonardo Viccari, Shoreline, WA (US); Justin Jon Derby, Edmonds, WA (US)

(73) Assignee: Amazon Technologies, Inc., Seattle, WA (US)

( * ) Notice: Subject to any disclaimer, the term of this patent is extended or adjusted under 35 U.S.C. 154(b) by 207 days.

This patent is subject to a terminal disclaimer.

(21) Appl. No.: 16/198,689

(22) Filed: Nov. 21, 2018

(51) Int. Cl.
*H04L 29/08* (2006.01)

(52) U.S. Cl.
CPC .............. *H04L 67/1031* (2013.01)

(58) Field of Classification Search
None
See application file for complete search history.

(56) References Cited

U.S. PATENT DOCUMENTS

| | | | | |
|---|---|---|---|---|
| 10,067,785 B1* | 9/2018 | Wei | ...................... | G06F 9/45558 |
| 10,581,728 B1* | 3/2020 | Zipperer | ............. | H04L 63/1458 |
| 10,853,111 B1* | 12/2020 | Gupta | ...................... | G06F 8/65 |
| 10,887,381 B1* | 1/2021 | Viccari | ................... | G06F 9/505 |
| 11,080,092 B1* | 8/2021 | Guo | ........................ | H04L 67/00 |
| 2009/0157870 A1* | 6/2009 | Nakadai | ................. | H04L 41/12 709/224 |
| 2013/0060946 A1* | 3/2013 | Kenneth | ............. | G06F 9/45558 709/226 |
| 2016/0357610 A1* | 12/2016 | Bartfai-Walcott | .... | G06F 9/5027 |
| 2018/0300290 A1* | 10/2018 | Klein | ...................... | G06F 16/93 |
| 2018/0302340 A1* | 10/2018 | Alvarez Callau | ....... | H04L 47/76 |
| 2019/0278928 A1* | 9/2019 | Rungta | ................... | G06F 9/485 |
| 2020/0057666 A1* | 2/2020 | Belikovetsky | ...... | H04L 63/0272 |
| 2021/0216603 A1* | 7/2021 | Ohtani | ................ | G06F 16/9535 |
| 2021/0276450 A1* | 9/2021 | Eshleman | ........... | H01M 10/482 |
| 2021/0281378 A1* | 9/2021 | Park | ...................... | H04L 1/1664 |

* cited by examiner

*Primary Examiner* — Dhairya A Patel
(74) *Attorney, Agent, or Firm* — Knobbe, Martens, Olson & Bear, LLP

(57) ABSTRACT

A rendering resources management component can maintain information that tracks rendering resources that have been assigned (or leased) to individual user devices. The rendering resources management component can further maintain information related thresholds for the number of available rendering resources in the rendering resource pools, including minimums, maximums or ranges. The rendering resources management component can further maintain information related to performance metrics associated with the assigned rendering resources. Based on one or more of the above information (or additional information), the rendering resources management component can then cause the instantiation or termination of rendering resources to manage the rendering resource pool.

21 Claims, 13 Drawing Sheets

MANAGEMENT OF ALLOCATED COMPUTING RESOURCES IN NETWORKED ENVIRONMENT

BACKGROUND

Generally described, computing devices and communication networks can be utilized to exchange data or information. In a common application, a computing device can request content from another computing device via the communication network. For example, a user at a personal computing device can utilize a browser application to request a content page (e.g., a network page, a Web page, etc.) or access a service from a server computing device via the network (e.g., the Internet). In such embodiments, the user computing device can be referred to as a client computing device and the server computing device can be referred to as a content provider or service provider.

In some applications, service providers can generate or receive data as part of the interaction with a plurality of user devices or other network-based devices in a closed or private network. In such embodiments, the service providers may wish to provide content to the user devices or make content available over a longer period of time. In such applications, the service provider may utilize rendering resources that can be assigned or associated with a user device over an extended period of time.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
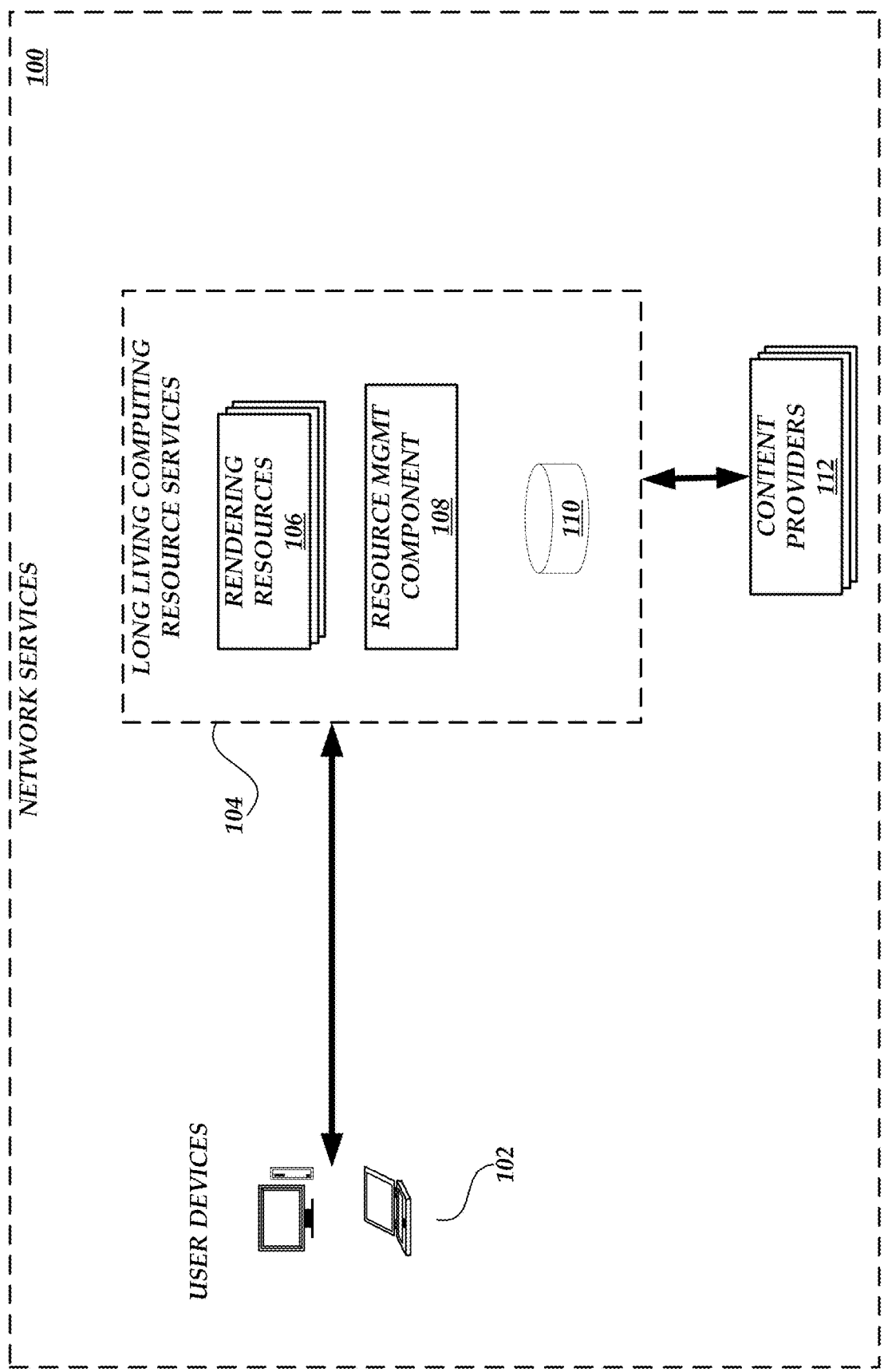
FIG. 1 is a block diagram of a network environment that includes one or more user devices, one or more rendering resources, a rendering resource management component, and one or more content providers in accordance with some embodiments.

Generally described, service providers or content providers can provide or host services that collect or generate data for storage and transmission. In one application, the service provider can host one or more services or network resources that interact with user computing devices or other service providers for purposes of facilitating information delivery. For example, a service provider can host one or more rendering resources that work in conjunction with a network application on user devices to provide content. The service provider can implement a closed or private network in which the user devices and rendering resources may access content that is available only within the closed network.

Generally described, to access content, user devices can request content from a content provider/source. The user device may be assigned or otherwise associated with a rendering resource such that the assigned rendering resource can process at least a portion of the content for user device. For example, for content that may be considered to be a more sensitive nature, the rendering resource can remove or include information prior to providing content to the user device. In another example, a rendering resource can receive unprocessed content from a content source and render at least a portion of the content on behalf of the user device. In such embodiments, the service provider may wish to allow the user devices to maintain a communication channel or communication connection with the assigned rendering resource, often referred to as a long-living or long term rendering resource. For example, a user device may initiate a request for content that is rendered by a rendering resource (e.g., via a network application) and remains available for access by the user computing device.

In some specific embodiments, a service provider can create a pool of rendering resources that may be available for assignment/allocation to user devices as long-living resources. In one aspect, the management of a pool of available rendering resources can be inefficient if the service provider does not have sufficient rendering resources available for incoming requests or has too many rendering resource available for incoming requests. Additionally, computing devices that may be hosting one or more instances of rendering resources can be inefficient when oversubscribed. Still further, the service provider can experience performance inefficiencies when attempting to update rendering resources that are configured as long-living resources.

To address potential inefficiencies associated with networks with rendering sources, a network service may maintain a pool of available rendering resource, such as network applications for accessing and processing content. The pool of rendering resources may be hosted as virtual machine instances hosted on physical computing devices and are made available for assignment to a set of user devices over a private or closed network. The service provider can further provide a rendering resources management component for managing multiple aspects of the pool of rendering resources. In one aspect, the rendering resources management component can receive or determine rendering resource pool configuration information, such as thresholds or criteria that define rendering resource pool sizes, performance or optimization thresholds and criteria for implementing actions responsive to the configuration information.

In another aspect, the rendering resources management component can facilitate in the management of rendering resources by tracking assigned and unassigned rendering resources. In still another aspect, the rendering resources management component can facilitate the updating/replacement of rendering resource pools including rendering resources that have been previously assigned to user devices and may be long-living rendering resources.

Generally described, one or more of the aspects of the present application will be described with regard to implementation of rendering resources for processing content. The rendering resources management component can maintain information that tracks rendering resources that have been assigned (or leased) to individual user devices. The rendering resources management component can further maintain information related thresholds for the number of available rendering resources in the rendering resource pools, including minimums, maximums or ranges. The rendering resources management component can further maintain information related to performance metrics associated with the assigned rendering resources. Based on one or more of the above information (or additional information), the rendering resources management component can then cause the instantiation or termination of rendering resources to manage the rendering resource pool.

In some scenarios, the rendering resources management component may determine or receive an indication that one or more rendering resources may need to be replaced, such as by a rendering resource that has been updated or configured in a different manner. In such scenarios, the rendering resources management component can process the information that tracks the rendering resources that have been assigned/leased. The rendering resources management component can then attempt to select unassigned rendering resources for termination and replacement by rendering resources implementing the replacement rendering resource. The rendering resources management component can then manage previously assigned rendering resources to attempt to avoid interruptions to long-living rendering resource assignments. In examples, the rendering resources management component can receive requests for assignments and can assign rendering resources designated for replacement if the rendering resource pool is not able to satisfy the request.

By utilization transliteration of tracking information and configuration information and a rendering resources management component, one or more aspects of the present application addresses the inefficiencies described above. More specifically, the rendering resources management component can maintain performance thresholds for the number of available rendering resources and the utilization of assigned rendering resources. This optimizes the utilization of the network computing resources and increases the efficiencies in the communication between rendering resources and user devices. Additionally, the rendering resources management component can cause the implementation of update/replacements for rendering resources while attempting to minimize disruptions in long-living rendering resource assignments.

One or more aspects of the present application will be described with regard to the cooperation of network applications on the rendering resources and network applications on the user devices, such as browser applications. In such embodiments, the network applications hosted on the rendering resources may correspond to a long-living rendering source to be accessed by the network application on an assigned user device. However, such examples are illustrative in nature and should not necessarily be construed as limiting.

FIG. 1 illustrates a general network environment 100 for the generation, processing and storing of content. Illustratively, network environment 100 will be described with regard to the generation, processing and storage of content associated with a closed network or private network. The network environment 100 includes a plurality of devices 102 utilized by individual users, generally referred to as user computing devices, configured to interact with one or more aspects of the network environment component to request data stored by components of the network environment 100. For example, the user devices 102 can transmit requests to query services or Web services that result in the generation of queries for data processed in the network environment 100.

User computing devices 102 may include any number of different computing devices capable of communicating with the networks 120, via a direct connection or via an intermediary. For example, individual accessing computing devices may correspond to a laptop or tablet computer, personal computer, wearable computer, server, personal digital assistant ("PDA"), hybrid PDA/mobile phone, mobile phone, electronic book reader, set-top box, camera, appliance (e.g., a thermostat or refrigerator), controller, digital media player, watch, eyewear, a home or car device, Internet of Things ("IoT") devices, virtual reality or augmented reality devices, and the like. Each user computing device 102 may optionally include one or more data stores (not shown in FIG. 1) including various applications or computer-executable instructions, such as web browsers, used to implement the embodiments disclosed herein. The user devices 102 may be configured to maintain or access long living rendering resources as described herein. Illustrative components of a user computing device 102 will be described with regard to FIG. 2.

Illustratively, the components of the network environment 100 may be any wired network, wireless network, or combination thereof. In addition, the networks may incorporate a personal area network, local area network, wide area network, cable network, fiber network, satellite network, cellular telephone network, data network or combination thereof. In the example environment of FIG. 1, the network is implemented as a private or closed network that may not be generally available to every computing device. Protocols and components for communicating via the other aforementioned types of communication networks are well known to those skilled in the art of computer communications and thus, need not be described in more detail herein. While the user device 102 is depicted as having a single connection to the components of the network environment, individual components of the user devices 102 may be connected to the network at disparate points.

The network environment 100 also includes a set of long living network services, generally referred to as network service 104 or network services 104, that represents a set of network services made available by one or more service providers via a communication network. Illustratively, to facilitate the receipt and processing of data, the network services 104 can include a set of rendering resources 106. Illustratively, rendering resources can include any one of a variety of applications or functions hosted on a physical machine or virtual machine instance and configured to provide information/content to user devices or implement functionality on behalf of, or requested by, the user devices 102. Illustrative components of a rendering resources corresponding to implementation of a network-based network application will be described with regard to FIG. 3.

The network services 104 further includes a rendering resource management component 108 for implementation of rendering resource configuration and performance information, managing individual instances of the rendering resources in the rendering resource pool, and processing updates/replacements of rendering resources. Illustrative components and operation of a featurization component 108 will be described with regard to FIG. 4. The rendering resources management component 108 can include one or more data stores 112 for maintaining configuration information, rendering resource assignment information and rendering resource termination queue information as described herein.

The network environment 100 can include a plurality of data services, such content providers 116, for collecting or generating data to be received and processed by one or more rendering resources 106. The content providers 116 may include one or more servers or components that correspond to any one of a variety of functions such as hosting content via a network, providing content via a network, and the like. In some embodiments, the content providers 116 may be hosted independent of the rendering resources 106 and rendering resources management component 108, such as in a stand-alone communication network and be connected to the network service(s) via communication network. In other embodiments, the content providers 116 and rendering resources may be implemented in an integrated manner. One skilled in the relevant art will appreciate that reference to the content providers 116 is intended solely to illustrate the transmission of data to network services and is not intended to limited to any particular type of information sources or type of content.

Figure 2:
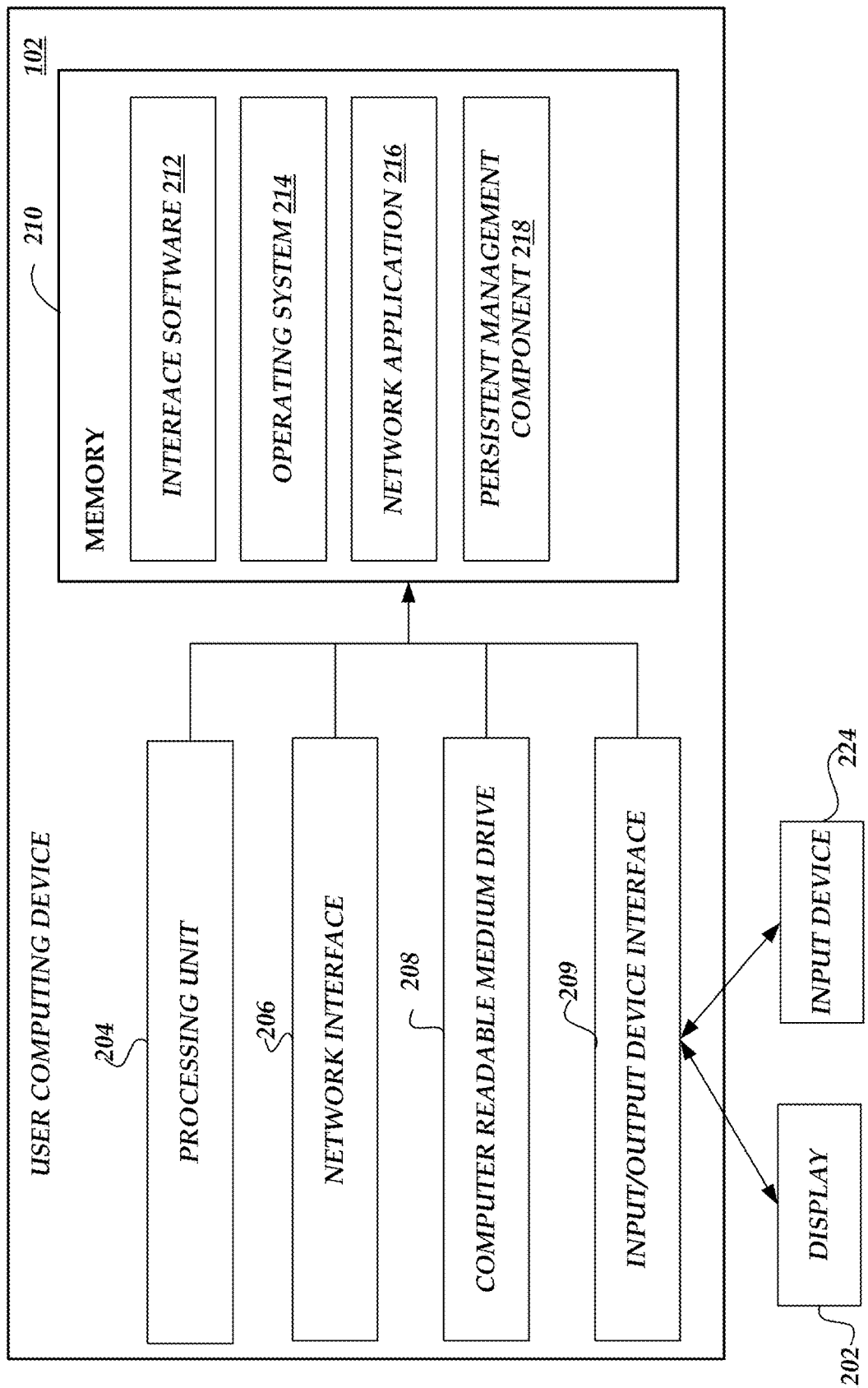
FIG. 2 is a block diagram illustrative of components of user device for interacting with rendering resources in accordance with some embodiments.

FIG. 2 depicts one embodiment of an architecture of an illustrative user computing device 102 that can generate content requests or queries to a rendering resource 106 in accordance with the present application. The general architecture of the user computing device 102 depicted in FIG. 2 includes an arrangement of computer hardware and software components that may be used to implement aspects of the present disclosure. As illustrated, the user computing device 102 includes a processing unit 204, a network interface 206, an input/output device interface 209, an optional display 202, and an input device 224, all of which may communicate with one another by way of a communication bus.

The network interface 206 may provide connectivity to one or more networks or computing systems, such as the network of FIG. 1, and the network services 104. The processing unit 204 may thus receive information and instructions from other computing systems or services via a network. The processing unit 204 may also communicate to and from memory 210 and further provide output information for an optional display 202 via the input/output device interface 209. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 102. The memory 210 may further include computer program instructions and other information for implementing aspects of the present disclosure. For example, in one embodiment, the memory 210 includes interface software 212 for transmitting data from the user device 102. In some embodiments, the memory 210 may include one or more additional software applications, such as network application 216, or components that are configured, at least in part, to request content and cooperate with a rendering resource component 106. Still further, the memory 210 can include a persistent management component 218 that can facilitate the maintenance of information related to the assignment of long-living rendering resources.

Figure 3:
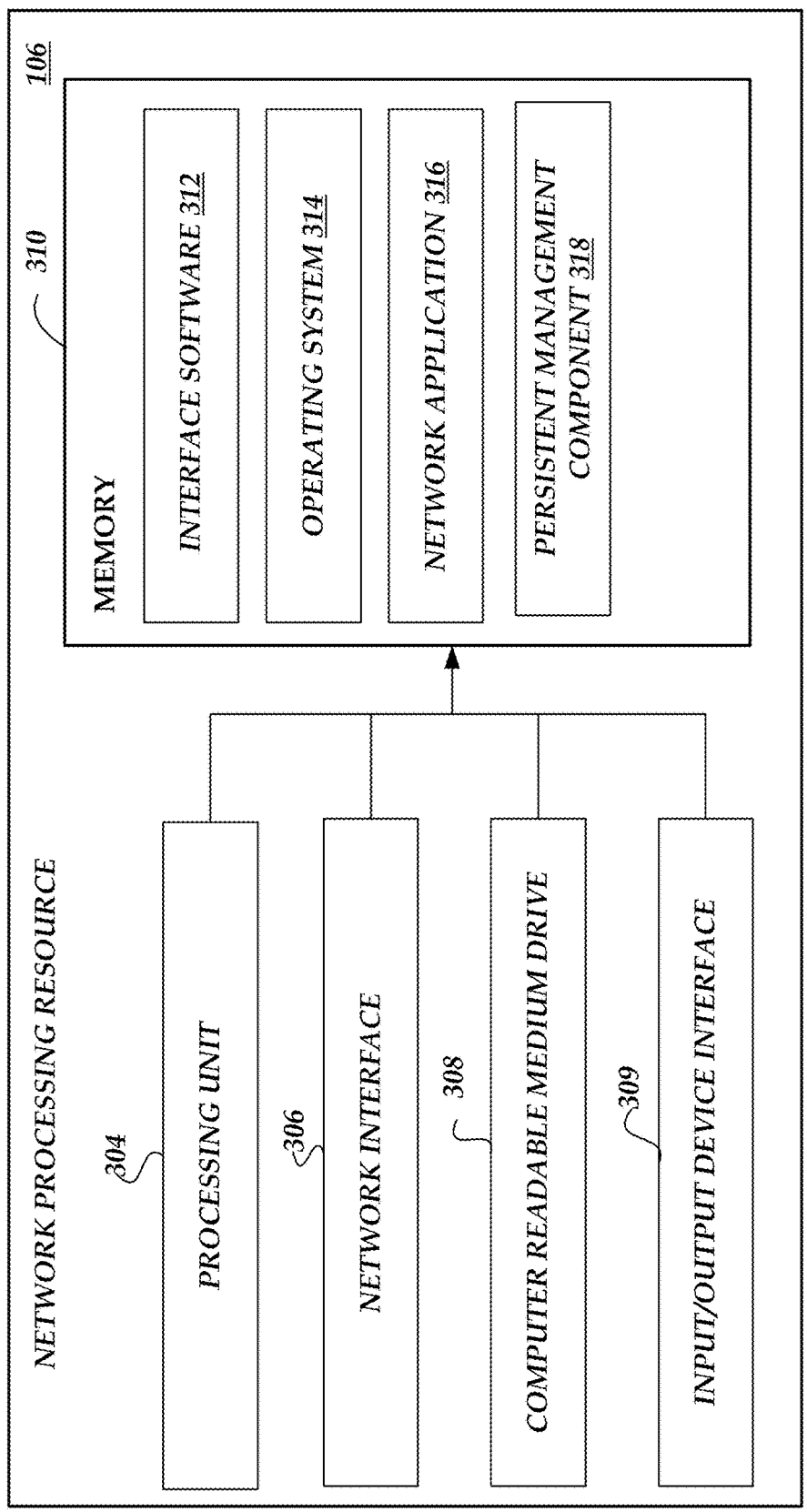
FIG. 3 is a block diagram illustrative of an illustrative computing device implementing a rendering resource that interacts with user devices and content providers in accordance with some embodiments.

FIG. 3 depicts one embodiment of an architecture of an illustrative rendering resource 106 that can generate content requests or process content from a content provider in accordance with the present application. The general architecture of the rendering resource 106 depicted in FIG. 3 includes an arrangement of computer hardware and software components that may be used to implement aspects of the present disclosure. As illustrated, the rendering resource 106 includes a processing unit 304, a network interface 306, an input/output device interface 309, all of which may communicate with one another by way of a communication bus.

The network interface 306 may provide connectivity to one or more networks or computing systems, such as the network of FIG. 1, and the network services 104. The processing unit 304 may thus receive information and instructions from other computing systems or services via a network. The processing unit 304 may also communicate to and from memory 310 and further provide information via the input/output device interface 309. The input/output device interface 309 may also accept input. In some embodiments, the rendering resource 106 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the rendering resource 106. The memory 310 may further include computer program instructions and other information for implementing aspects of the present disclosure. For example, in one embodiment, the memory 310 includes interface software 313 for transmitting data to the user device 102 or to content provider 116. In some embodiments, the memory 310 may include one or more additional software applications, such as network application 316, or components that are configured, at least in part, to request content and cooperate with a rendering resource component 106. Illustratively, the network application 316 is configured to cooperate with the network application of the user device 102 such that at least a portion of the processing of content request is performed by the rendering resource 106. For example, the rendering resource 106 can process requested content in accordance with security or privacy policies. In another example, the rendering resource 106 can process content from a content provider and supplement content. In still another embodiment, the rendering resources can perform at least some aspect of the processing of the content processing, such as rendering, on behalf of the user device 102. Still further, the memory 310 can include a persistent management component 318 that can facilitate the maintenance of information related to the assignment of the rendering resource 106 to a user device 102.

Figure 4:
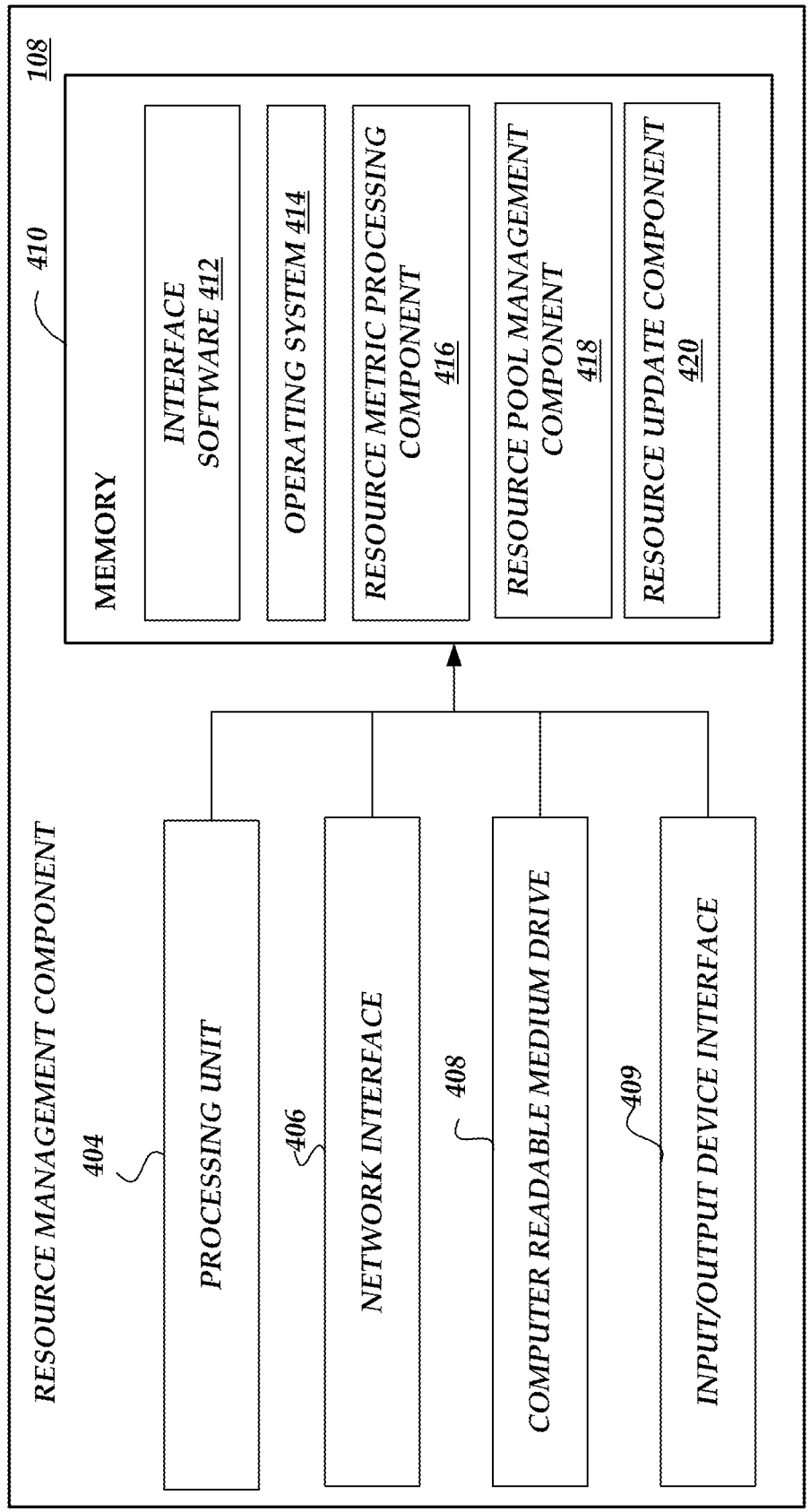
FIG. 4 is a block diagram illustrative of a rendering resources management component for managing various aspects in accordance with some embodiments.

FIG. 4 depicts one embodiment of an architecture of an illustrative computing device for implementing various aspects of the rendering resources management component 108 in accordance with aspects of the present application. The rendering resources management component 108 can be a part of the instantiation of virtual machine instances associated with the rendering resources 106 (e.g., the pool of rendering resources). Alternatively, the computing device may a stand-alone device independent of the rendering resources 106.

The general architecture of the computing device 108 depicted in FIG. 4 includes an arrangement of computer hardware and software components that may be used to implement aspects of the present disclosure. As illustrated, the computing device 400 includes a processing unit 404, a network interface 406, a computer readable medium drive 408, an input/output device interface 409, all of which may communicate with one another by way of a communication bus. The components of the computing device 400 may be physical hardware components or implemented in a virtualized environment.

The network interface 406 may provide connectivity to one or more networks or computing systems, such as the network of FIG. 1. The processing unit 404 may thus receive information and instructions from other computing systems or services via a network. The processing unit 404 may also communicate to and from memory 410 and further provide output information. In some embodiments, the computing device 400 may include more (or fewer) components than those shown in FIG. 4.

The memory 410 may include computer program instructions that the processing unit 404 executes in order to implement one or more embodiments. The memory 410 generally includes RAM, ROM, or other persistent or non-transitory memory. The memory 410 may store an operating system 414 that provides computer program instructions for use by the processing unit 404 in the general administration and operation of the computing device 108. The memory 410 may further include computer program instructions and other information for implementing aspects of the present disclosure. For example, in one embodiment, the memory 410 includes interface software 412 for receiving and processing data records. Memory 410 includes a resource processing component 416 for processing received metric information related to a pool of rendering resources 106 as described herein. The memory 410 further includes a rendering resource pool component 418 for the generation and management of the pool of rendering resources 106 as long-living rendering resources as described herein. The memory 410 also includes a resource update component 420 for the management of updates/replacements for the rendering resources 106 as described herein.

As specified above, in one embodiment, the computing device 108 illustrated in FIG. 4 can be implemented as physical computing devices or virtualized computing devices in a computing network. In another embodiment, the computing device 108 may be implemented as logical components in a virtual computing network in which the functionality of the computing device 108 is implemented by an underlying substrate network of physical computing devices. Thus, aspects of the present application should not be limited to interpretation requiring a physical, virtual or logical embodiment unless specifically indicated as such.

Figure 5A:
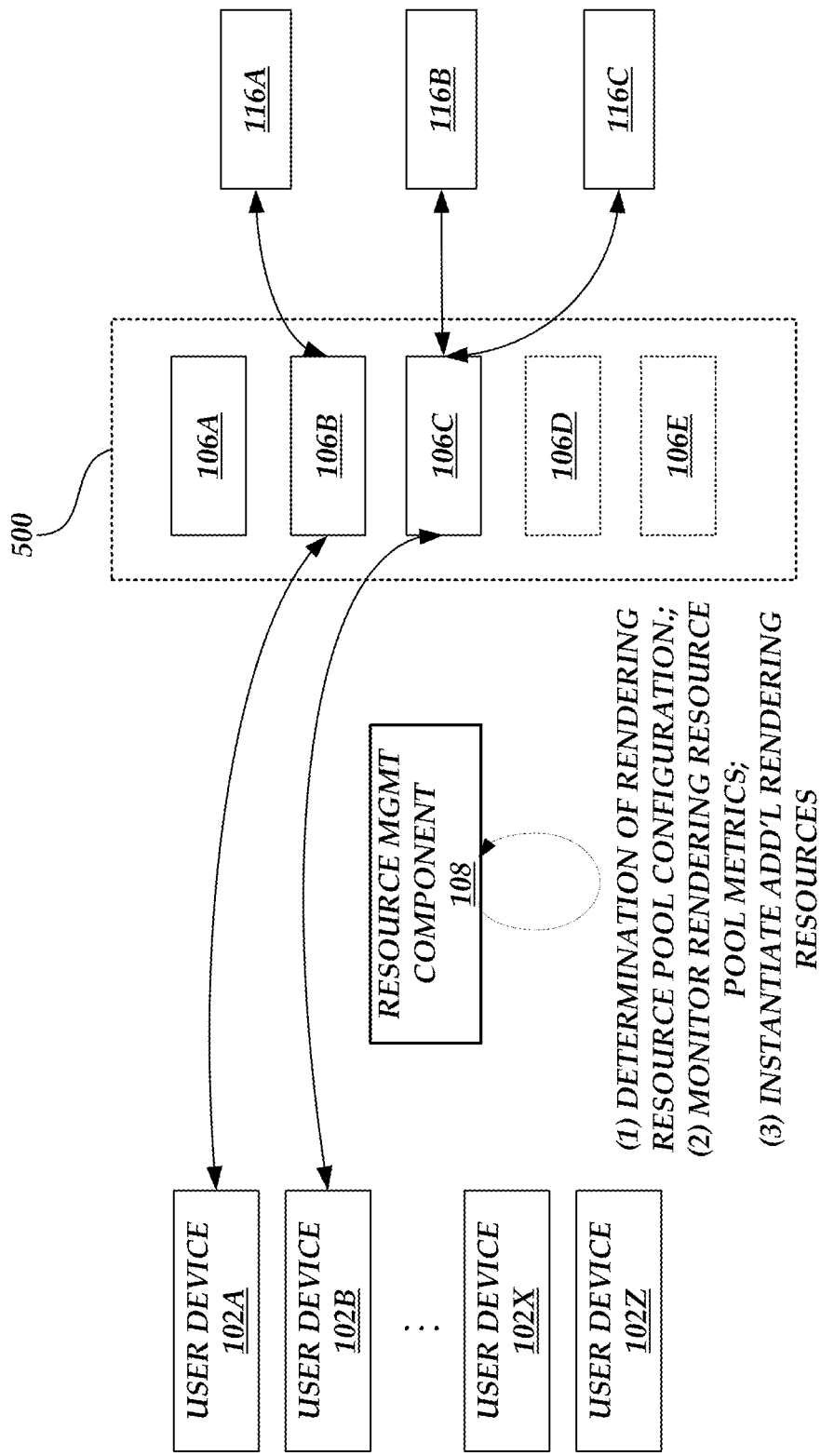
FIGS. 5A-5C are block diagrams illustrating the management of a pool of rendering resources for a set of user devices in accordance with some embodiments.
Figure 5B:
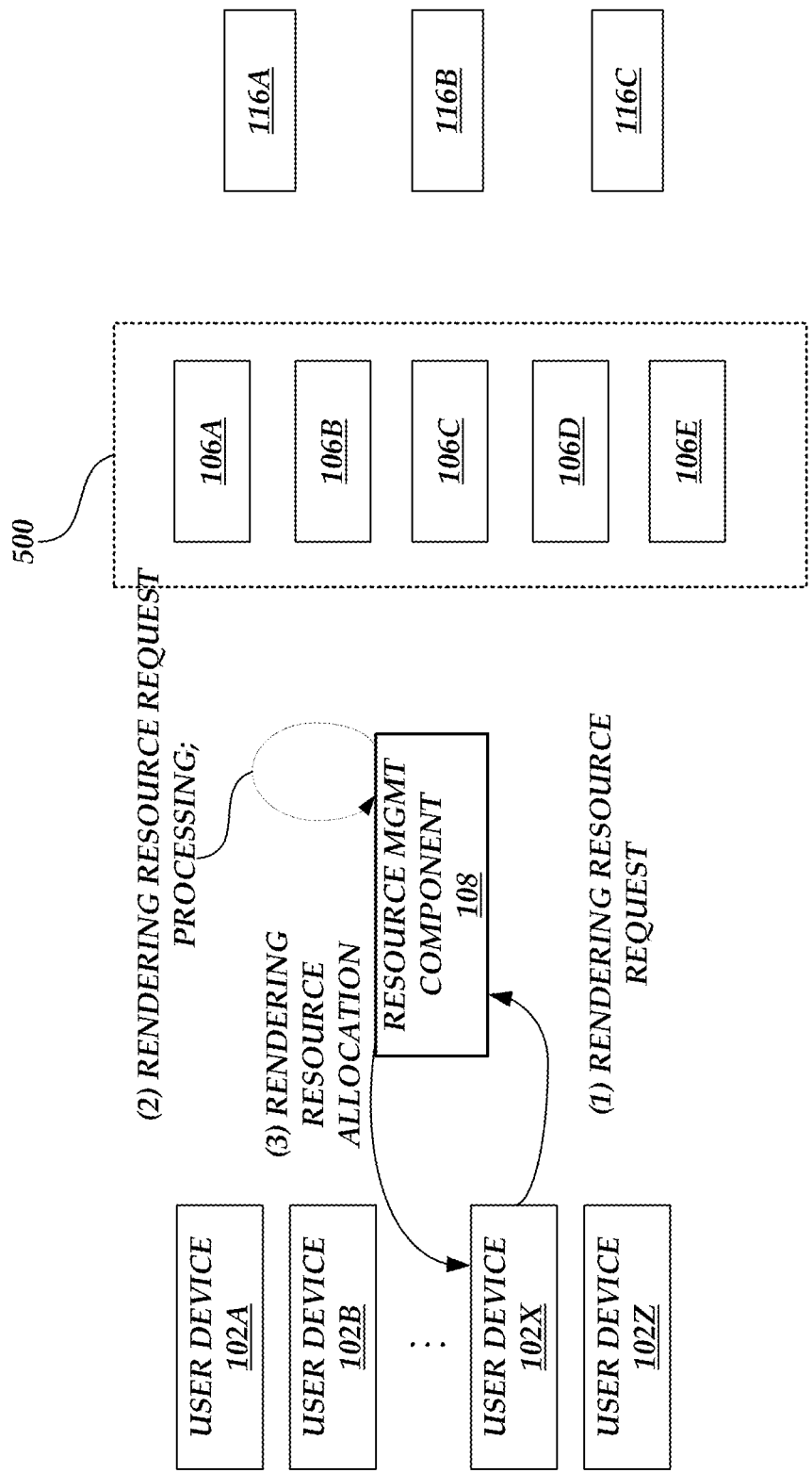
Figure 5C:
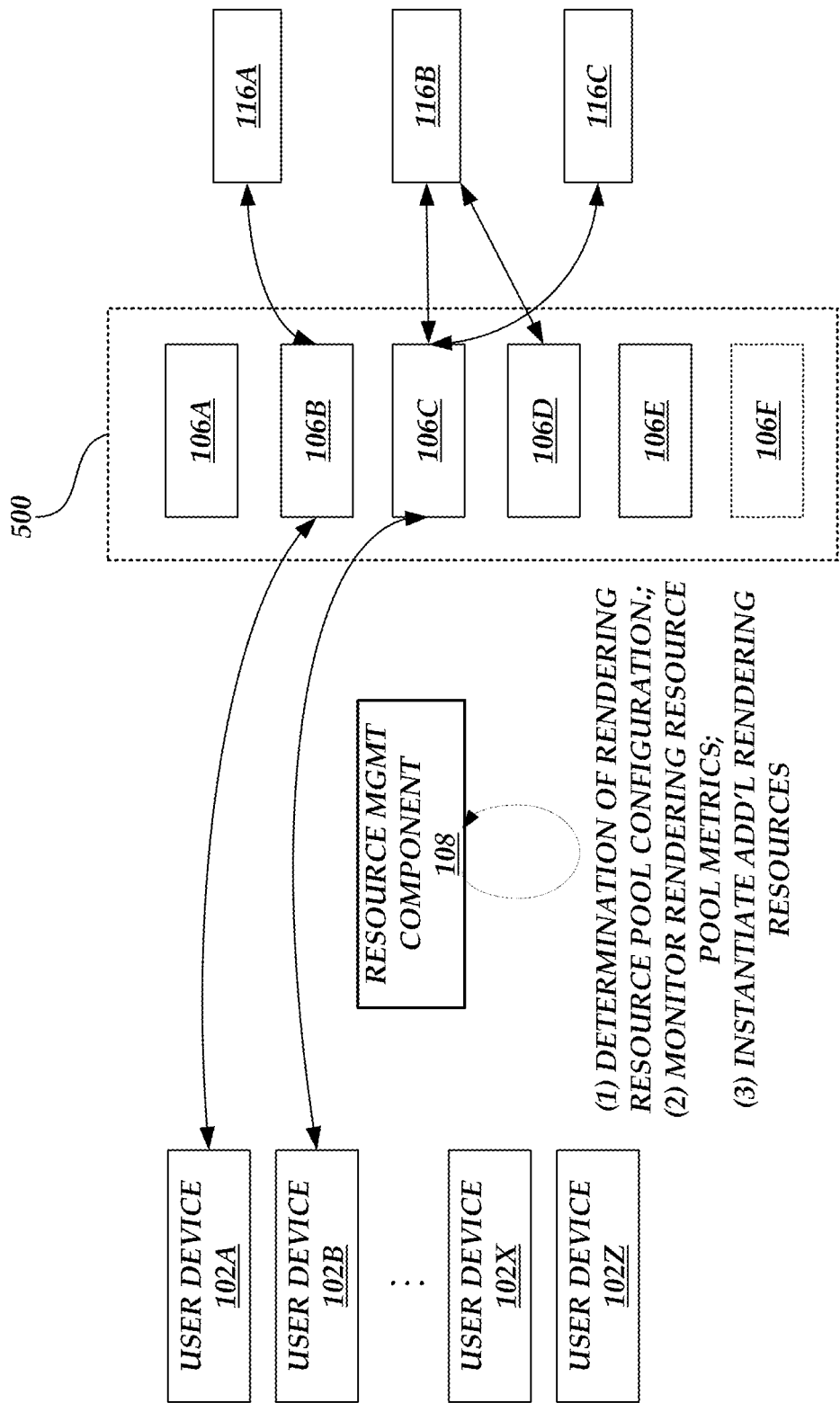

Turning now to FIGS. 5A-5C, an illustrative interaction for the instantiation and maintenance of a pool of rendering resources 106 by the rendering resources management component 108 will be described. For purposes of illustration, it is assumed that one or more illustrative content providers 116A-116C or other customer are configured to provide data to a pool of rendering resources 106, represented initially as rendering resource pool 106A-106C. Still further, for purposes of illustration, a pool of user devices 102 can request or access content, represented as user devices 102A-102Z.

With reference to FIG. 5A, illustration for an initial management a rendering resource pool will be described. For purpose of illustration, at least a plurality for rendering resources 106A-106C have been instantiated and made available for assignment to a user device 102. For purposes of illustration, the processing of a request and selection of an available rendering resource can be implemented in consideration of load balancing. One example is described in co-pending and commonly assigned U.S. patent application Ser. No. 16/198,706 entitled LOAD BALANCING REQUESTS SUCH THAT TARGET RESOURCES SERVE A SINGLE CLIENT and filed on Nov. 21, 2018, now issued as U.S. Pat. No. 10,887,381 entitled MANAGEMENT OF ALLOCATED COMPUTING RESOURCES IN NETWORKED ENVIRONMENT. U.S. patent application Ser. No. 16/198,706 is incorporated by reference herein. Still further, as illustrated in FIG. 5A, rendering resources 106B and 106C have processed content on behalf of user devices 102A and 102 B from content providers 116A-116C and cooperate with user devices 102A and 102B as long-living resources. In some embodiments, the assignment of a rendering resource can include the specification of a communication port that the user device 102 and assigned rendering resource 106 will use exclusively for communications. In other embodiments, the assignment of a rendering resource can include the generation and transmission of a token that is utilized by user device 102 in communications to identify the assigned rendering resources from the pool of rendering resources. One skilled in the relevant art will appreciate however that such examples are simply for illustrative purposes and do not reflect actual numbers of a rendering resource pool, content providers 116 or user devices 102.

At (1), the rendering resources management component 108 determines one or more rendering resource pool configuration information. Illustratively, the rendering resource pool configuration can include a specification of a maximum or minimum number of rendering resources 106 that should be in the rendering resource pool, a maximum number of assigned rendering resources in the rendering resource pool, a maximum or minimum number of unassigned rendering resources in the rendering resource pool, or various combinations thereof. The rendering resource pool configuration information can also include a specification of performance metrics for assigned rendering resources 106, including maximum or minimum thresholds for various measurable operations of the rendering resources, including, but not limited to, processor utilization or usage, memory utilization or usage, network through put utilization, error rates, and the like. The rendering resource pool configuration information can also include cost information associated with maintaining different rendering resources (e.g., different costs associated with different virtual machine instances) or related to geographic or logical locations of the rendering resources (e.g., different costs based on the logical locations of the individual rendering resources).

At (2), the rendering resources management component 108 monitors one or more rendering resource pool information. Illustratively, the rendering resource pool information can corresponding, directly or indirectly, to information utilized to process the rendering pool configuration. The rendering resource pool metric information can include, but is not limited to, the number of rendering resources 106 in the rendering resource pool, the number of assigned rendering resources in the rendering resource pool, or the number of unassigned rendering resources in the rendering resource pool. The rendering resource pool metric information can also include collected performance metrics for individual assigned rendering resources 106, including processor utilization or usage, memory utilization or usage, network through put utilization, error rates, and the like. In some instances, the rendering resources management component 108 may determine or generate the rendering resource pool information, such as the identification of the total number of rendering resources in the rendering resource pool or the number of assigned or unassigned rendering resources. In another instances, the rendering resources management component 108 can receive one or more portions of the performance information from the rendering resources 106 or a corresponding management service.

For purposes of illustration, assume that at least a minimum number of unassigned rendering resources 106 is below the threshold or otherwise indicative of a need to add additional rendering resources to the rendering resource pool. Accordingly, illustratively, at (3), the rendering resources management component 108 causes the instantiation of two additional rendering resources 106D and 106E. The rendering resources management component 108 may utilize additional, independent network services to instantiate the additional rendering resources, such as via an API or other protocol. As described above, the rendering resource configuration information can define the number of additional rendering resources to add to the pool of rendering resources and additional logistic information, such as timing information, cost information and the like.

With reference now to FIG. 5B, after instantiation of the additional resources, at some point after the instantiation of the additional rendering resources 106D and 106E, the rendering resources management component 108 receives a request from user device 102X for a rendering resource allocation. Illustratively, the request can correspond to specific request to establish an assignment with rendering resource 106. Alternatively, the request can correspond to a content request from the user device 102 which is received by the rendering resources management component 108 and interpreted as the request to assign a rendering resource 106 from the rendering resource pool.

At (2), the rendering resources management component 108 processes the request to select and assign a rendering resource from the rendering resource pool. As described above, the rendering resources management component 108 can utilize various processes to select a rendering resource, including load balancing, resource optimization, costs optimization and the like. Based on the selection, the rendering resources management component 108 assigns a rendering resource 106 in response to the user request. Illustratively, the assignment of a resource can include the assignment of a network port to the user device 102X for exclusive transmission of content request communications. In other embodiments, the assignment of a rendering resource can include the generation and transmission of a token that is utilized by user device 102 in communications to identify the assigned rendering resources from the pool of rendering resources. The assignment can also include additional metadata to facilitate such communication. In such embodiments, the actual virtual machine instance of the rendering resource 106 can be modified so long as a rendering resource 106 is assigned and configured to process subsequent communications from the user device 102X. At (3), the rendering resources management component 108 transmits the rendering resource configuration information to the user device 102X. For purposes of further illustration, it will be assumed that rendering resource 106D has been assigned and will cooperate with a network application on user device 102X to render content and is considered to be a long living rendering resource.

Turning now to FIG. 5C, after the assignment of the additional rendering resources or after the assignment of a number of rendering resources 106, the rendering resources management component 108 will continue to management the aspects of the rendering resource pool. At (1), the rendering resources management component 108 determines one or more rendering resource pool configuration information or any updates to the rendering resource pool configuration information. As described above, the rendering resource pool configuration can include a specification of a maximum or minimum number of rendering resources 106 that should be in the rendering resource pool, a maximum number of assigned rendering resources in the rendering resource pool, a maximum or minimum number of unassigned rendering resources in the rendering resource pool, or various combinations thereof. The rendering resource pool configuration information can also include a specification of performance metrics for assigned rendering resources 106, including maximum or minimum thresholds for various measurable operations of the rendering resources, including, but not limited to, processor utilization or usage, memory utilization or usage, network through put utilization, error rates, and the like. The rendering resource pool configuration information can also include cost information associated with maintaining different rendering resources (e.g., different costs associated with different virtual machine instances) or related to geographic or logical locations of the rendering resources (e.g., different costs based on the logical locations of the individual rendering resources). In some embodiments, the updating of the rendering pool configuration may be omitted.

At (2), the rendering resources management component 108 monitors one or more rendering resource pool information. As described above, the rendering resource pool information can correspond, directly or indirectly, to information utilized to process the rendering pool configuration. The rendering resource pool information can include, but is not limited to, the number of rendering resources 106 in the rendering resource pool, the number of assigned rendering resources in the rendering resource pool, or the number of unassigned rendering resources in the rendering resource pool. The rendering resource pool information can also include collected performance metrics for individual assigned rendering resources 106, including processor utilization or usage, memory utilization or usage, network through put utilization, error rates, and the like. In some instances, the rendering resources management component 108 may determine or generate the rendering resource pool information, such as the identification of the total number of rendering resources in the rendering resource pool or the number of assigned or unassigned rendering resources. In another instances, the rendering resources management component 108 can receive one or more portions of the performance information from the rendering resources 106 or a corresponding management service.

For purposes of illustration, assume that at least a minimum number of unassigned rendering resources 106 is below the threshold or otherwise indicative of a need to add additional rendering resources to the rendering resource pool based on the allocation of a rendering resource to user device 102X. Accordingly, illustratively, at (3), the rendering resources management component 108 causes the instantiation of two additional rendering resources 106F. The rendering resources management component 108 may utilize additional, independent network services to instantiate the additional rendering resources, such as via an API or other protocol. As described above, the rendering resource configuration information can define the number of additional rendering resources to add to the pool of rendering resources and additional logistic information, such as timing information, cost information and the like.

Figure 6A:
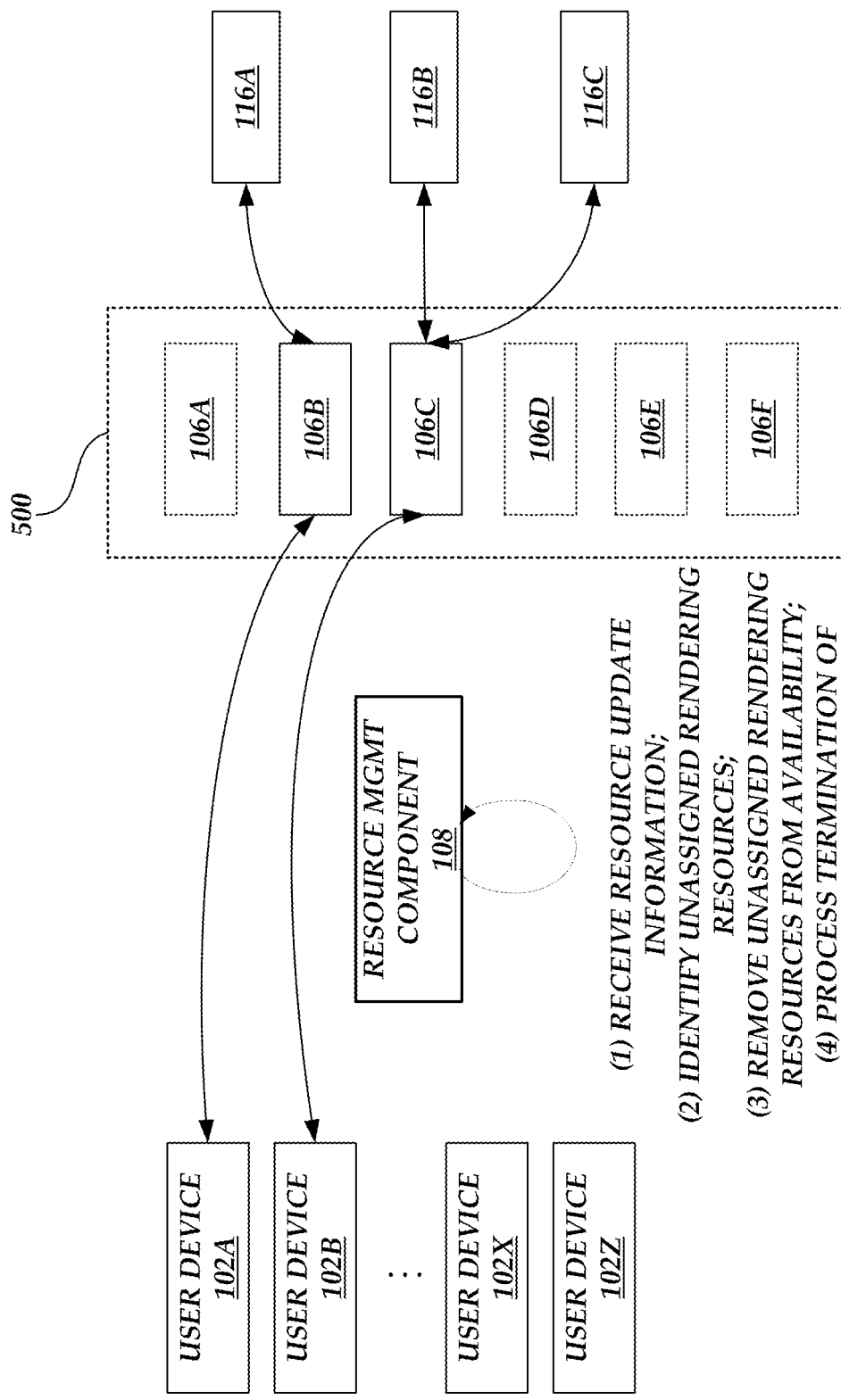
FIGS. 6A-6C are block diagrams illustrating the updating and management of a pool of rendering resources for a set of user devices in accordance with some embodiments.
Figure 6B:
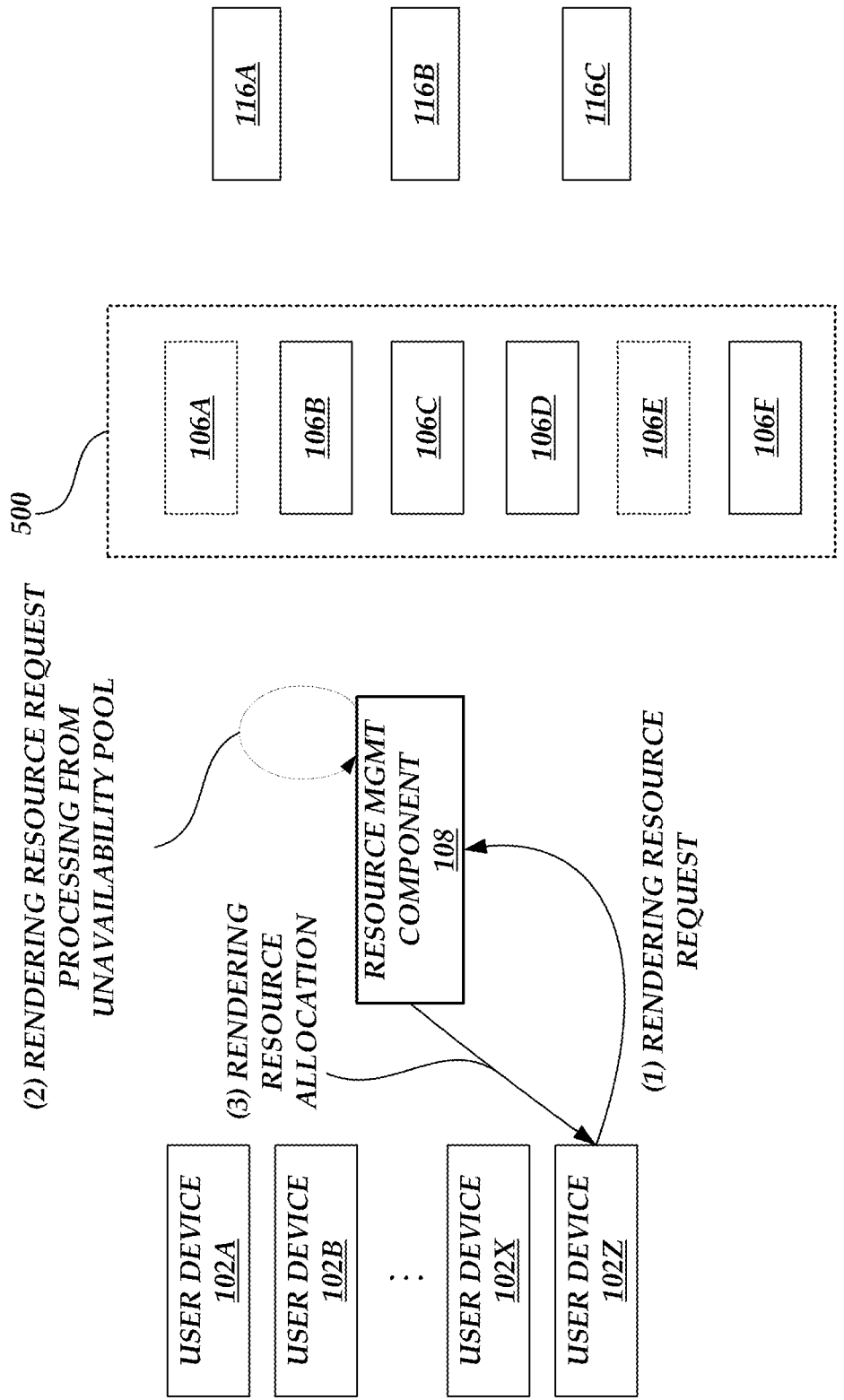
Figure 6C:
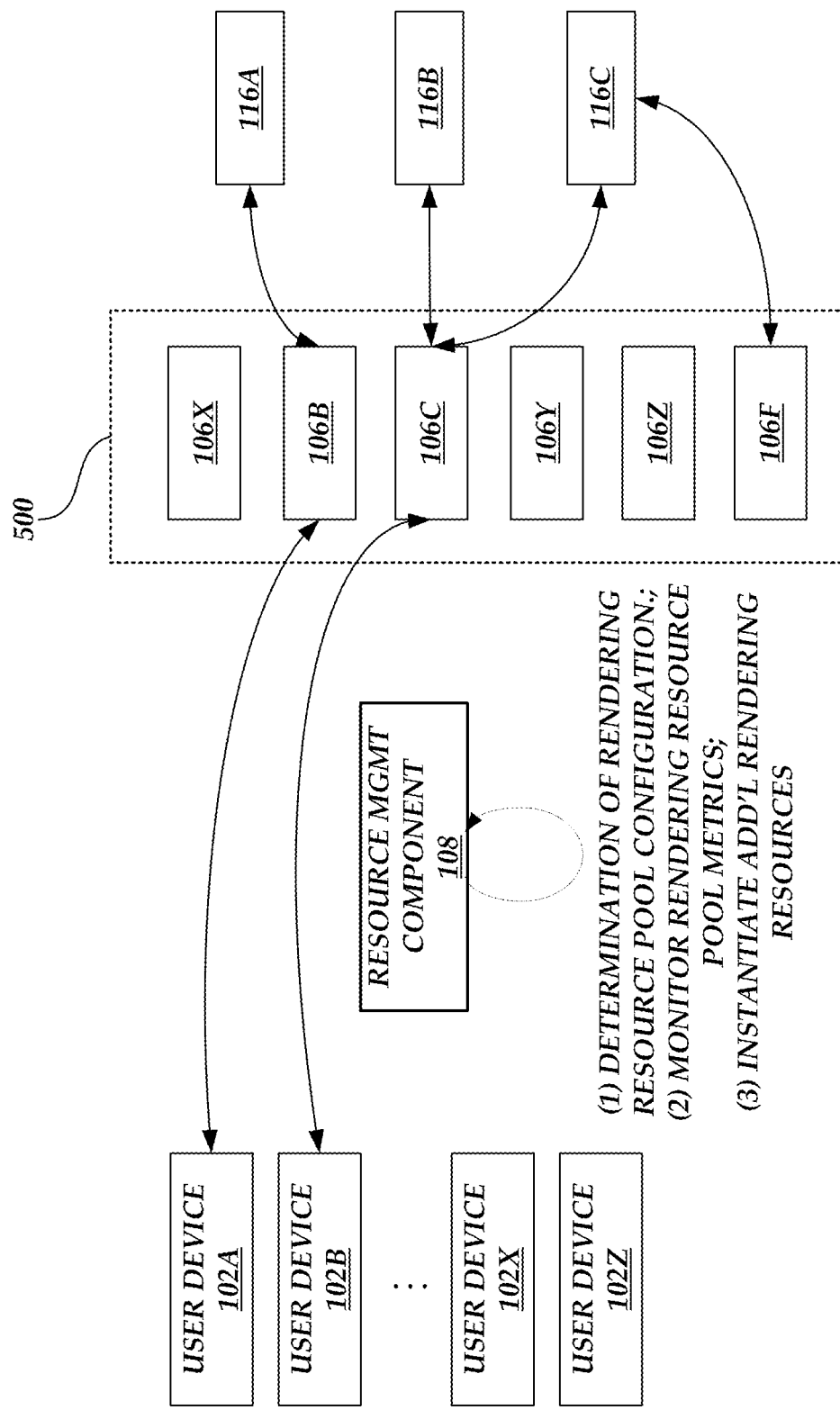

Turning now to FIGS. 6A-6C, illustrative embodiments for the processing of update or replacement information will be described. Illustratively, the rendering resources management component 108 can determine or receive information related to an update to the rendering resources, a command to replace one or more rendering resources in the pool of rendering resources, or a configuration change to rendering resources. For example, the rendering resources management component 108 may receive an indication from a service provider that the instantiated virtual machine instance should be replaced with a different virtual machine instance. In another example, the rendering resources management component 108 can implement a configuration change to modify the performance of the pool of rendering resources. Accordingly, at (1), the rendering resources management component 108 receives resource update information or otherwise determines that an update is available. Generally, the rendering resource will not be modified but can be replaced with a different instantiated virtual machine instance.

At (2), the rendering resources management component 108 identifies a current unidentified rendering resources. As described above, the rendering resources management component 108 can maintain a list or table of assigned rendering resources from the pool of rendering resources. As illustrated in FIG. 6A, rendering resources 106A, 106D, 106E and 106 F have been identified. At (3), the rendering resources management component 108 then removes or causes to be removed the identified unassigned rendering resources. Illustratively, the rendering resources management component 108 can maintain a first in, first out (FIFO) queue that identifies which rendering resources should be replaced. Accordingly, removing the identified rendering resources can correspond to the addition of the rendering resource to the termination queue and the removal of the rendering resource (or designation thereof) of the list of available rendering resources. In some embodiments, the rendering resources management component 108 can place all the identified available rendering resources in the termination queue as part of the same process. Alternatively, the rendering resources management component 108 can stagger the placement of the rendering resources in the termination queue, such as via time intervals, to maintain a minimal number of available resources or based on satisfaction of some other criteria.

At (4), the rendering resources management component 108 processes the termination of the rendering resources. Illustratively, the rendering resources management component 108 can release virtual machine instances or otherwise instruct a service provider to remove the virtual machine instance from availability. The replacement of the removed virtual machine instances will be discussed with regard to FIG. 6C.

With reference first to FIG. 6B, in some instances, the rendering resources management component 108 may receive requests to assign a rendering resource to user device, such as under device 102Z. For purposes of illustration, at (1), the rendering resources management component 108 receives the request from the user device 102Z for a rendering resource. If the request is received during the processing of the termination queue, the pool of available rendering resources may not be able to accommodate the request. Accordingly, at (2), the rendering resources management component 108 selects a rendering resource from the termination queue. Illustratively, since the termination queue is a FIFO queue, the rendering resources management component 108 selects the last entry in the termination queue, which corresponds to the last identified rendering resource added to the termination queue. By selecting the last entry, the rendering resources management component 108 selects the last rendering resource added and most likely represents the rendering resources that is the least out of date (or at least equal) of the rendering resources added to the termination queue. Additionally, the removal of the last added rendering resource likely represents the least disruptive to the processing of the termination queue. At (3), the rendering resources management component 108 transmits the rendering resource pool configuration information to the user device 102Z. For purposes of further illustration, it will be assumed that rendering resource 106F has been removed from the termination queue and assigned to user device 120Z.

Turning now to FIG. 6C, the assignment of the additional rendering resources after the removal of the unassigned rendering resources will be described, the rendering resources management component 108 will continue to management the aspects of the rendering resource pool. At (1), the rendering resources management component 108 determines one or more rendering resource pool management information or any updates to the rendering resource pool configuration information. As described above, the rendering resource pool configuration can include a specification of a maximum or minimum number of rendering resources 106 that should be in the rendering resource pool, a maximum number of assigned rendering resources in the rendering resource pool, a maximum or minimum number of unassigned rendering resources in the rendering resource pool, or various combinations thereof. The rendering resource pool configuration information can also include a specification of performance metrics for assigned rendering resources 106, including maximum or minimum thresholds for various measurable operations of the rendering resources, including, but not limited to, processor utilization or usage, memory utilization or usage, network through put utilization, error rates, and the like. The rendering resource pool configuration information can also include cost information associated with maintaining different rendering resources (e.g., different costs associated with different virtual machine instances) or related to geographic or logical locations of the rendering resources (e.g., different costs based on the logical locations of the individual rendering resources). In some embodiments, the updating of the rendering pool configuration may be omitted.

At (2), the rendering resources management component 108 monitors one or more rendering resource pool information. As described above, the rendering resource pool information can correspond, directly or indirectly, to information utilized to process the rendering resource pool configuration. The rendering resource pool information can include, but is not limited to, the number of rendering resources 106 in the rendering resource pool, the number of assigned rendering resources in the rendering resource pool, or the number of unassigned rendering resources in the rendering resource pool. The rendering resource pool information can also include collected performance metrics for individual assigned rendering resources 106, including processor utilization or usage, memory utilization or usage, network through put utilization, error rates, and the like. In some instances, the rendering resources management component 108 may determine or generate the rendering resource pool information, such as the identification of the total number of rendering resources in the rendering resource pool or the number of assigned or unassigned rendering resources. In another instances, the rendering resources management component 108 can receive one or more portions of the rendering resource pool information from the rendering resources 106 or a corresponding management service, such as individual performance metrics (e.g., processor utilization, etc.).

For purposes of illustration, assume that at least a minimum number of unassigned rendering resources 106 is below the threshold based on the removal of the previous rendering resources 102A, 102D, and 102E and the reclamation of 102 F. Accordingly, illustratively, at (3), the rendering resources management component 108 causes the instantiation of three new rendering resources 106X, 106Y and 106Z. The rendering resources management component 108 may utilize additional, independent network services to instantiate the additional rendering resources, such as via an API or other protocol. As described above, the rendering resource configuration information can define the number of additional rendering resources to add to the pool of rendering resources and additional logistic information, such as timing information, cost information and the like.

Figure 7:
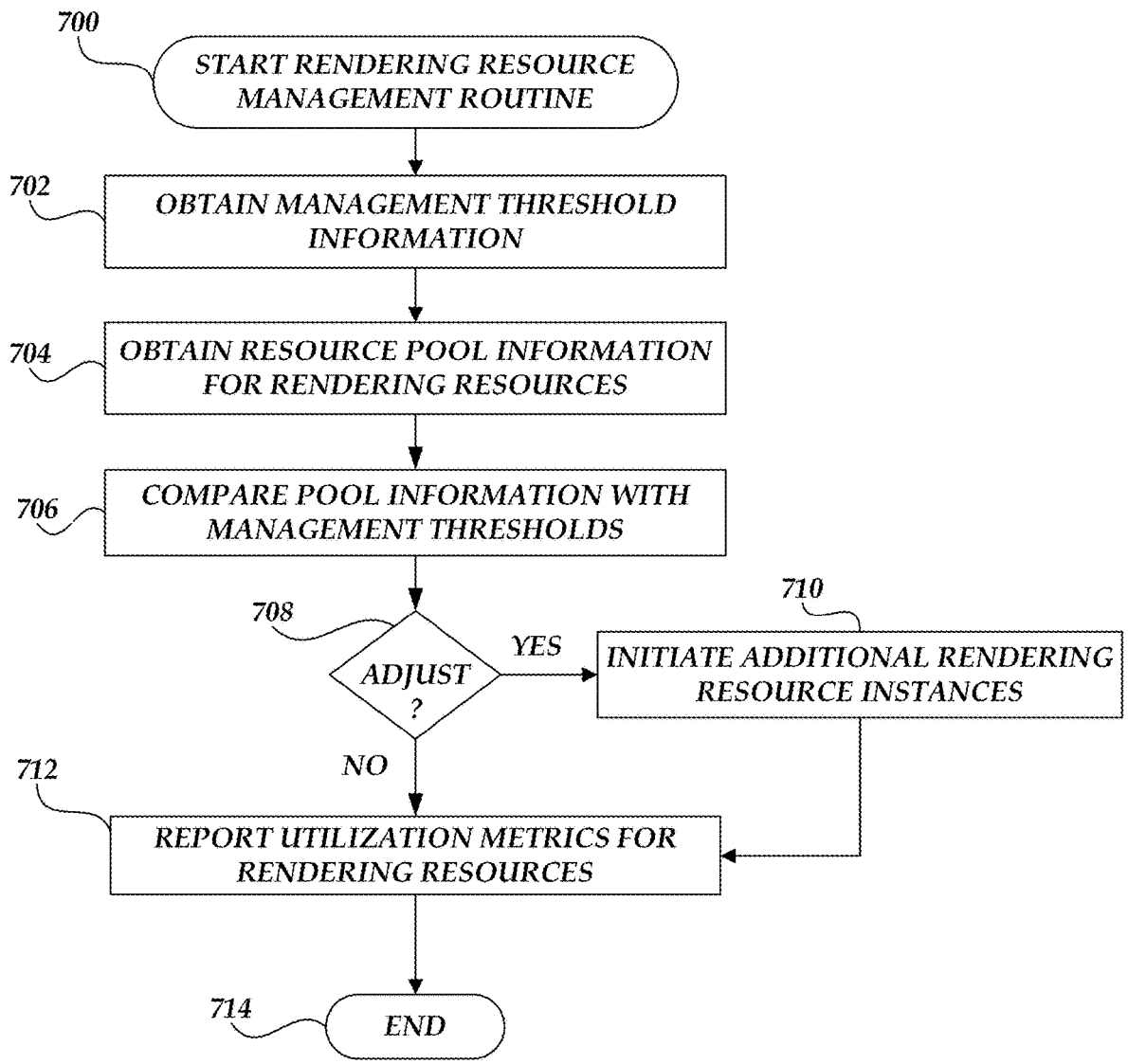
FIG. 7 is a flow diagram illustrative of a rendering resources processing routine implemented by a rendering resources management component in accordance with some embodiments.

With reference to FIG. 7, a flow diagram 700 illustrative of a rendering resource processing routine 700 implemented by the rendering resources management component 108 will be described. At block 702, the rendering resources management component 108 determines one or more rendering resource pool configuration information. Illustratively, the rendering resource pool configuration can include a specification of a maximum or minimum number of rendering resources 106 that should be in the rendering resource pool, a maximum number of assigned rendering resources in the rendering resource pool, a maximum or minimum number of unassigned rendering resources in the rendering resource pool, or various combinations thereof. The rendering resource pool configuration information can also include a specification of performance metrics for assigned rendering resources 106, including maximum or minimum thresholds for various measurable operations of the rendering resources, including, but not limited to, processor utilization or usage, memory utilization or usage, network through put utilization, error rates, and the like. The rendering resource pool configuration information can also include cost information associated with maintaining different rendering resources (e.g., different costs associated with different virtual machine instances) or related to geographic or logical locations of the rendering resources (e.g., different costs based on the logical locations of the individual rendering resources).

At block 704, the rendering resources management component 108 obtains or monitors rendering resource pool information. Illustratively, the rendering resource pool information can correspond, directly or indirectly, to information utilized to process the rendering resource pool configuration. The rendering resource pool information can include, but is not limited to, the number of rendering resources 106 in the rendering resource pool, the number of assigned rendering resources in the rendering resource pool, or the number of unassigned rendering resources in the rendering resource pool. The rendering resource pool information can also include collected performance metrics for individual assigned rendering resources 106, including processor utilization or usage, memory utilization or usage, network through put utilization, error rates, and the like. In some instances, the rendering resources management component 108 may determine or generate the rendering resource pool information, such as the identification of the total number of rendering resources in the rendering resource pool or the number of assigned or unassigned rendering resources. In another instances, the rendering resources management component 108 can receive one or more portions of the performance information from the rendering resources 106 or a corresponding management service.

At decision block 706, the rendering resources management component 108 compares the collected rendering resource pool information with the rendering resource pool configuration information, such as the performance thresholds. For example, the rendering resources management component 108 can compare whether the minimum threshold of a number of assigned rendering resources in the pool of rendering resources is met or exceeded. In another example, the rendering resources management component can compare whether individual rendering resources are associated with performance metrics for utilization of computing resources that are being exceeded. At decision block 708, a test is conducted to determine whether the rendering resource configuration information indicates that one or more additional rendering resources should be added or otherwise adjusted. Illustratively, the rendering resource configuration information can specify whether exceeding a threshold or criteria can result in the causation of the instantiation of additional rendering resources to the pool of rendering resources and the number of additional rendering resources. In some example, the rendering resource configuration can include a specification of no additional rendering resources or establish additional or supplemental criteria to be satisfied prior to the addition of rendering resources to the pool of rendering resources. For example, the individual exceeding of performance thresholds may not directly result in the addition of additional rendering resources to the pool absent additional criteria, such as a threshold number of individually exceeded performance thresholds, and the like. If so, at block 710, the rendering resources management component 108 causes the instantiation of additional rendering resources. The number or configuration of the additional rendering resources can be defined in the rendering resource configuration information or otherwise configured by the rendering resources management component 108. The rendering resources management component 108 may utilize additional, independent network services to instantiate the additional rendering resources, such as via an API or other protocol.

Once additional rendering resources have been added at block 710 or if not additional rendering resources need to be added, at block 712, the rendering resources management component 108 can optionally generate result information identifying the collected metrics and processed configuration information. For example, the rendering resources management component 108 can transmit the information or provide user interfaces indicative of the metrics, thresholds or other configuration information. At block 714, the routine 700 terminates or optionally repeats.

Figure 8:
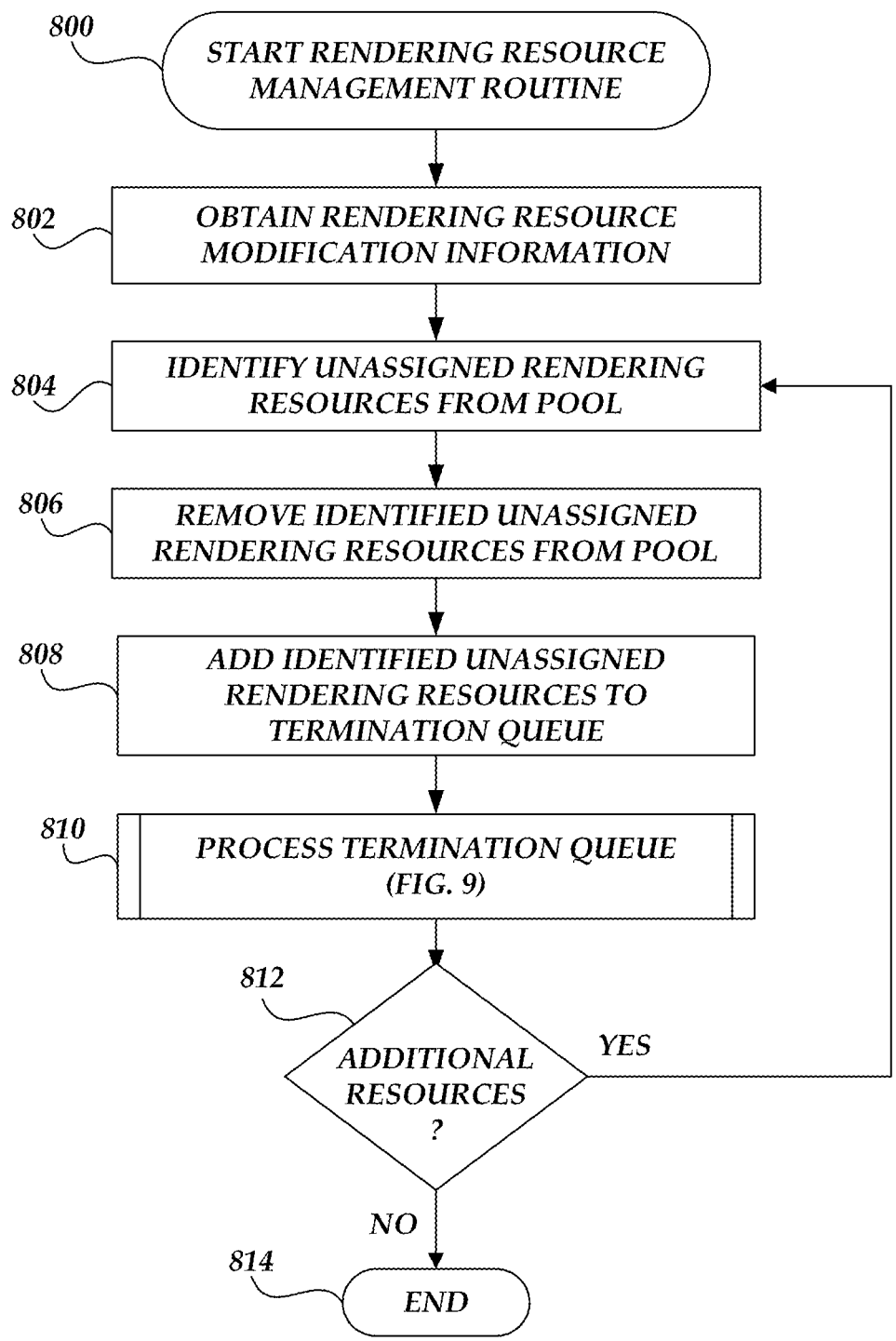
FIG. 8 is a flow diagram illustrative of a rendering resources processing routine implemented by a rendering resources management component in accordance with some embodiments.

With reference now to FIG. 8, a rendering resource management routine 800 for the processing of updates or replacements by the rendering resources management component 108 will be described. At block 802, the rendering resources management component 108 receives resource update information or otherwise determines that an update is available. Generally, the rendering resource will not be modified but can be replaced with a different instantiated virtual machine instance. Illustratively, the rendering resources management component 108 can determine or receive information related to an update to the rendering resources or a configuration change to rendering resources. For example, the rendering resources management component 108 may receive an indication from a service provider that the instantiated virtual machine instance should be replaced with a different virtual machine instance. In another example, the rendering resources management component 108 can implement a configuration change to modify the performance of the pool of rendering resources.

At block 804, the rendering resources management component 108 identifies a current unidentified rendering resources. As described above, the rendering resources management component 108 can maintain a list or table of assigned rendering resources from the pool of rendering resources. As illustrated in FIG. 6A, rendering resources 106A, 106D, 106E and 106 F have been identified. At block 806, the rendering resources management component 108 then removes or causes to be removed the identified unassigned rendering resources. Additionally, at block 808, the rendering resources management component 108 can maintain a first in, first out (FIFO) queue that identifies which rendering resources should be replaced. Accordingly, removing the identified rendering resources can correspond to the addition of the rendering resource to the termination queue and the removal of the rendering resource (or designation thereof) of the list of available rendering resources. In some embodiments, the rendering resources management component 108 can place all the identified available rendering resources in the termination queue as part of the same process. Alternatively, the rendering resources management component 108 can stagger the placement of the rendering resources in the termination queue, such as via time intervals, to maintain a minimal number of available resources or based on satisfaction of some other criteria.

At block 810, the rendering resources management component 108 processes the termination of the rendering resources. An illustrative sub-routine 900 (FIG. 9) for processing the termination queue will be described below. At decision block 812, a test is conducted to determine if there are additional rendering resources to be processed. Illustratively, one or more rendering resources could be currently allocated at the time the update/replacement determination is received/determined. Accordingly, the routine 800 can loop to block 804 to process the previously allocated rendering resources once they are no longer allocated. Alternatively, the rendering resources management component 108 can cause the unallocation of rendering resources after the expiration of a maximum time replacement criteria. Once all the rendering resources have been processed, routine 800 terminates at block 814.

Figure 9:
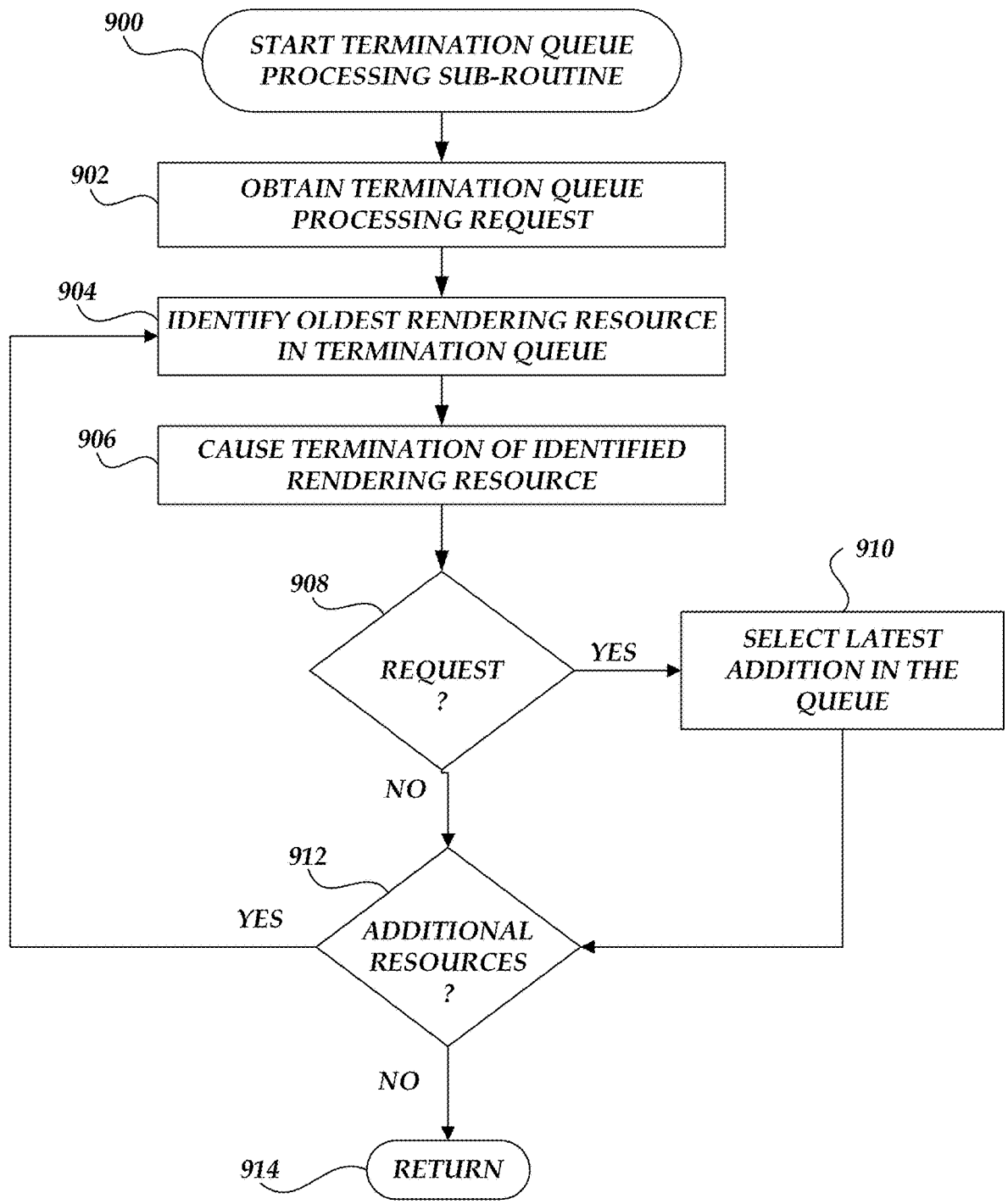
FIG. 9 is a flow diagram illustrative of a termination queue processing sub-routine implemented by a rendering resources management component in accordance with some embodiments.

Turning now to FIG. 9, a sub-routine for processing the termination queue will be described. At block 902, the rendering resources management component 108 obtains the termination queue processing request as described in routine 800. The termination queue processing request can be generated based on the number of entries in the termination queue, the current utilization of the rendering resource queue, the expiration of time and the like. At block 904, the rendering resources management component 108 identifies the oldest rendering resources in the termination queue. As described above, the termination queue is illustratively a FIFO queue in which the oldest entry is the first entry in the queue. Accordingly, the rendering resources management component 108 selects the oldest rendering resource to replace by selecting the first entry in the FIFO queue. At block 906, the rendering resources management component 108 causes the termination of the selected rendering resource.

In some embodiments, if the rendering resources management component 108 receives a request for rendering resources and the rendering resource pool is sufficiently large to process the request because of the addition of unassigned rendering resources to the termination queue, the rendering resources management component 108 will remove an unassigned rendering resource from the termination queue. As illustrated, at decision block 908, a test is conducted to determine whether a request is received that cannot be processed. If so, at block 910, the rendering resources management component 108 selects a rendering resource from the termination queue. Illustratively, since the termination queue is a FIFO queue, the rendering resources management component 108 selects the last entry in the termination queue, which corresponds to the last identified rendering resource added to the termination queue. By selecting the last entry, the rendering resources management component 108 selects the last rendering resource added and most likely represents the rendering resources that is the least out of date (or at least equal) of the rendering resources added to the termination queue. Additionally, the removal of the last added rendering resource likely represents the least disruptive to the processing of the termination queue.

At decision block 912, a test is conducted to determine whether all the rendering resources in the termination queue have been processed or whether additional rendering resources remain. If rendering resources remain, the sub-routine 900 returns to block 904 to process the next rendering resource. Alternatively, the sub-routine 900 terminates and returns at block 914.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for managing a pool of rendering resources for use in processing resources in a networked environment, the system comprising:

a plurality of computing devices configured to individually implement a rendering resource, wherein the plurality of computing devices form a pool of rendering resources and wherein individual rendering resources within the pool of rendering resources include a network application utilized in cooperation with network applications on user devices; and one or more computing devices associated with a rendering resource management component, wherein the rendering resource management component is configured to:

receive rendering resource pool configuration information including threshold information associated with the pool of rendering resources and individual performance information for the individual rendering resources;

obtain rendering resource pool information, the rendering resource pool information including individual resource performance metric information for the individual rendering resources in the rendering resource pool and rendering resource pool attribute information including a count of unassigned rendering resources in the pool of rendering resources, the individual resource performance metric information comprising a measurable operation associated with a performance threshold;

evaluate the individual resource performance metric information against the threshold information to determine if a number of individually exceeded performance thresholds exceeds a threshold number defined by the threshold information; and in response to a determination that the number of individually exceeded performance thresholds exceeds the threshold number, cause the addition of one or more rendering resources to the pool of rendering resources.

2. The system of claim 1, wherein the rendering resource pool configuration includes a minimum number of unassigned rendering resources in the pool of rendering resources.

3. The system of claim 1, wherein the rendering resource pool configuration information includes performance thresholds for individual rendering resources and wherein the metric information includes at least a utilization of computing resources by individual rendering resources.

4. The system of claim 1, wherein the rendering resource management component is further operative to generate an output indicative of the evaluated individual resource performance metric information.

5. The system of claim 1, wherein the rendering resource management component is further operative to omit the addition of rendering resources based on the evaluated individual resource performance metric information.

6. A computer-implemented method to manage a pool of resources for utilization by user devices in a private communication network, the method comprising:

obtaining rendering resource pool information for a pool of rendering resources, wherein individual rendering resources are assignable to user devices to render content in cooperation with network applications on the user devices, wherein the rendering resource pool information includes individual resource performance metric information for the individual rendering resources in the pool of rendering resources and rendering resource pool attribute information including a number of unassigned rendering resources in the pool of rendering resources, the individual resource performance metric information comprising a measurable operation associated with a performance threshold;

evaluating the individual resource performance metric information against threshold information associated with the pool of rendering resources to determine if a number of individually exceeded performance thresholds exceeds a threshold number defined by the threshold information; and in response to a determination that the number of individually exceeded performance thresholds exceeds the threshold number, causing the addition of one or more rendering resources to the pool of rendering resources.

7. The computer-implemented method of claim 6 further comprising receiving the threshold information.

8. The computer-implemented method of claim 6, wherein the threshold information is a portion of received rendering resource pool configuration information that includes at least one of threshold information associated with a number of rendering resources in the pool of rendering resources or performance information for individual rendering resources in the pool of rendering resources.

9. The computer-implemented method of claim 8, wherein the rendering resource pool configuration information includes threshold information associated with a number of rendering resources in the pool of rendering resources and performance information for individual rendering resources in the pool of rendering resources.

10. The computer-implemented method of claim 8, wherein the rendering resource pool configuration information includes a minimum number of unassigned rendering resources in the pool of rendering resources.

11. The computer-implemented method of claim 6, wherein the threshold information includes computing resource thresholds for individual rendering resources in the pool of rendering resources and wherein the rendering pool information includes at least a utilization of computing resources by one or more individual rendering resources in the pool of rendering resources.

12. The computer-implemented method of claim 6 further comprising generating an output indicative of the evaluated individual resource performance metric information.

13. The computer-implemented method of claim 6, wherein causing the addition of one or more rendering resources includes causing the addition of a set of rendering resources based on rendering resource pool configuration information associated with the pool of rendering resources.

14. The computer-implemented method of claim 6 further comprising assigning a rendering resource from the pool of rendering resources responsive to a request from a user device in the closed communication network.

15. The computer-implemented method of claim 14, wherein assigning a rendering resource from the pool of rendering resources responsive to a request from a user device in the closed communication network includes associating at least one of a communication port to communications between the assigned rendering resource and a user device or an identification token.

16. The computer-implemented method of claim 14 further comprising:

evaluating rendering resource configuration information based on the assigned rendering resource; and causing the addition of one or more rendering resources based on the evaluated rendering resource pool configuration information.

17. A computer-implemented method to manage a pool of resources for utilization by user devices in a closed communication network, the method comprising:

evaluating rendering resource pool configuration information for a pool of rendering resources based at least in part on individual resource performance metric information for individual resources in the rendering resource pool and attribute information for the pool of rendering resources including a number of unassigned rendering resources in the pool of rendering resources, wherein rendering resources are assignable to user devices to render content in cooperation with the user devices, the individual resource performance metric information comprising a measurable operation associated with a performance threshold, the rendering resource pool configuration information including threshold information associated with the pool of rendering resources, wherein the evaluating comprises evaluating the individual resource performance metric information against the threshold information to determine if a number of individually exceeded performance thresholds exceeds the threshold number; and in response to a determination that the number of individually exceeded performance thresholds exceeds the threshold number, causing a change to the pool of rendering resources based on the evaluated rendering resource pool configuration information.

18. The computer-implemented method of claim 17, wherein the rendering resource pool configuration information includes attribute thresholds associated with the pool of rendering resources and performance information for individual rendering resources of the pool of rendering resources.

19. The computer-implemented method of claim 17, wherein causing a change to the pool of rendering resources includes causing an addition of one or more rendering resources based on the evaluated rendering resource pool configuration information.

20. The computer-implemented method of claim 17 further comprising assigning a rendering resource from the pool of rendering resources responsive to a request from a user device in the closed communication network.

21. The computer-implemented method of claim 17 further comprising:
- evaluating rendering resource configuration information based on the assigned rendering resource; and
- causing the addition of one or more rendering resources based on the evaluated rendering resource configuration information.

* * * * *